United States Patent [19]

Anzawa et al.

[11] Patent Number: 4,619,849

[45] Date of Patent: Oct. 28, 1986

[54] CONTAINER SUPERIOR IN CRACK RESISTANCE

[75] Inventors: Haruyoshi Anzawa, Okayama; Kenji Satoh, Tondabayashi; Yoshinari Tanaka, Kurashiki; Takuji Okaya, Nagaokakyo, all of Japan

[73] Assignee: Kuraray Co., Ltd., Kurashiki, Japan

[21] Appl. No.: 646,369

[22] Filed: Aug. 30, 1984

[30] Foreign Application Priority Data

Sep. 8, 1983 [JP] Japan ................................ 58-166022

[51] Int. Cl.$^4$ .............................................. B65D 23/00
[52] U.S. Cl. ...................................... 428/35; 428/515; 428/516
[58] Field of Search ......................... 428/35, 515, 516

[56] References Cited

U.S. PATENT DOCUMENTS

| | | | |
|---|---|---|---|
| 4,288,401 | 9/1981 | Keith et al. | 264/554 |
| 4,451,512 | 4/1984 | Yazaki et al. | 428/516 |
| 4,559,266 | 12/1985 | Mizasa et al. | 428/516 |

FOREIGN PATENT DOCUMENTS 146183 11/1979 Japan ..................................... 428/35

Primary Examiner—John E. Kittle
Assistant Examiner—James J. Seidleck
Attorney, Agent, or Firm—Kramer and Brufsky

[57] ABSTRACT

A multi-layered packaging container superior in crack resistance, said container being made up of an outer layer of thermoplastic resin and an inner layer of saponified product of ethylene-vinyl acetate copolymer characterized in that the ethylene content is 25 to 60 mole %, the degree of saponification of the vinyl acetate component is higher than 96 mole %, the melt viscosity index is lower than 1, the specific gravity (d) is in the range specified by the formula (1) below, and $Y_1$ and $Y_2$ are in the range specified by the formula (2) below:

$$1.274 - 4.4 \times 10^{-3}X < d < 1.332 - 4.4 \times 10^{-3}X \quad (1)$$

$$|Y_1 - Y_2| \leq 1 \quad (2)$$

where d is the specific gravity of EVOH resin at 25° C., X is the ethylene content (mole %) of EVOH resin, and $Y_1$ and $Y_2$ are the melt viscosity indices of the thermoplastic resin and the saponified product of ethylene-vinyl acetate copolymer, respectively.

5 Claims, No Drawings

CONTAINER SUPERIOR IN CRACK RESISTANCE

BACKGROUND OF THE INVENTION

1. Field of the Invention:

The present invention relates to a container superior in crack resistance made up of an inner layer and an outer layer, said inner layer being made of a saponification product of ethylene-vinyl acetate copolymer (referred to as EVOH resin hereinafter) having a specific composition, melt viscosity index, and specific gravity, and said outer layer being made of a thermoplastic resin having a melt viscosity index in a specific range established according to the melt viscosity index of the EVOH resin.

2. Description of the Prior Art:

The conventional glass containers for agricultural chemicals and the conventional metal containers for gasoline, kerosene, and other petroleum products are being replaced by plastic containers, particularly those made of a thermoplastic resin like a polyolefin, especially polyethylene resin, because of its superior physical and chemical properties (e.g., light in weight, rust-resistant), sufficient mechanical strength, and impact resistance. Attempts are being made to improve plastic containers by providing them with an inner layer made of EVOH resin which is superior in oxygen barrier properties and resistance to oil and organic solvents, particularly hydrocarbon solvents. This idea, however, has not been put to practical use because of some problems yet to be solved. That is, the inner layer made of EVOH resin is liable to crack when it is kept in contact with a hydrocarbon solvent, polar organic solvent, or any chemicals containing such a solvent for a long period of time. Cracking occurs because EVOH resin is dried prior to molding and EVOH resin after molding (which is accomplished at about 200° C.) is in the state of almost absolute dryness. This is a serious obstacle to putting EVOH resin to practical use.

Although much has been studied on the cracking of polyethylene and other resins, very little is known about why and how EVOH resins crack. Thus, so far there is no effective means available for preventing the inner layer of EVOH resin from cracking.

The cracking cannot be avoided by simply laminating an EVOH layer on a polyethylene layer as in the case of the container for agricultural chemicals made up of an outer layer of polyethylene containing calcium carbonate and an inner layer of EVOH resin, which is disclosed in Japanese Patent Laid-open No. 146183/1979.

In order to overcome the above-mentioned disadvantage, the present inventors carried out extensive studies and found that the cracking is associated with the degree of crystallization and the specific gravity of the EVOH resin involved. They also found that where EVOH resin is used in combination with a thermoplastic resin, cracking occurs frequently if the thermoplastic resin has a low melt viscosity index (abbreviated as MI value hereinafter), that the cracking of EVOH resin has something to do with the relationship between the MI value of EVOH resin and the MI value of the thermoplastic resin, and that cracking occurs more frequently in a container of composite structure than in a container made of EVOH resin alone.

The present inventors studied the cause and mechanism of cracking, the relation with property values of EVOH resin and other thermoplastic resin combined with EVOH resin, and the relation with the molding method. (It is assumed that residual stress resulting from molding promotes cracking in the containers of composite structure.) As the result of the studies, there was established a means for preventing cracking of EVOH resin used as an inner layer of containers of composite structure.

SUMMARY OF THE INVENTION

Accordingly, it is an object of this invention to provide a multi-layered packaging container superior in crack resistance, said container being made up of an outer layer of thermoplastic resin and an inner layer of EVOH resin characterized in that the ethylene content is 25 to 60 mole %, the degree of saponification of the vinyl acetate component is higher than 96 mole %, the MI value is lower than 1, the specific gravity (d) is in the range specified by the formula (1) below, and $Y_1$ and $Y_2$ are in the range specified by the formula (2) below.

$$1.274 - 4.4 \times 10^{-3} X < d < 1.332 - 4.4 \times 10^{-3} X \quad (1)$$

$$|Y_1 - Y_2| \leq 1 \quad (2)$$

where d is the specific gravity of EVOH resin at 25° C., X is the ethylene content of EVOH resin, and $Y_1$ and $Y_2$ are the MI values of the thermoplastic resin and EVOH resin, respectively.

The MI value is measured at 190° C. under a load of 2.16 kg in accordance with ASTM D 1238-65T, and it is expressed in terms of g/10 minutes.

DETAILED DESCRIPTION OF THE PREFERRED EMBODIMENTS

The EVOH resin used in this invention should be one which contains 25 to 60 mole % of ethylene. One containing less than 25 mole % of ethylene is poor in moldability; and one containing more than 60 mole % of ethylene is poor in oxygen barrier properties and resistance to organic solvents, particularly hydrocarbon solvents and is not adequate for use as a packaging material.

In the case where the degree of saponification is higher than particularly 98 mole % and the requirements of this invention are not satisfied, cracking of EVOH resin occurs readily and frequently. The effect of this invention is significant when EVOH resin has a degree of saponification higher than 96 mole %, particularly 98 mole %. On the other hand, EVOH resin having a degree of saponification lower than 96 mole % is less liable to crack, and the effect of this invention is not significant in the case of such EVOH resin. EVOH resin having a low degree of saponification does not crack readily but is of no practical value because of its poor oxygen barrier properties and low resistance to organic solvents.

The thermoplastic resin used in this invention includes polyolefin resins such as polyethylene, polypropylene, and modified polyethylene, and polyester resins such as polyethylene terephthalate. Preferable among them are polyolefin resins, particularly polyethylene resin having an MI value lower than 2. The most suitable one is high-density polyethylene having an MI value lower than 1 and a density higher than 0.935 g/cc. Because of superior impact resistance and abrasion resistance, it meets the requirements of containers of agricultural chemicals which often contain hydrocarbon solvents such as xylene.

It is considered that cracking has something to do with residual stress which is caused when a thermoplastic resin as mentioned above and EVOH resin are made into containers of composite structure by coextrusion, costretch-blowing, or deep drawing of composite sheet. Cracking occurs particularly in the case where the containers are filled with an organic solvent.

The present inventors prepared a large variety of multi-layered containers from EVOH resins having varied specific gravity values and MI values and thermoplastic resins, with or without inorganic filler, having varied MI values. Whether they crack or not was investigated by filling them with non-polar solvents such a cyclohexane, xylene, and toluene; polar solvents such as ethyl acetate, tetrahydrofuran, and dimethylformamide; and agricultural chemicals such as DDVP emulsion, Estox emulsion, Hinozan emulsion, Ronstar emulsion, Elsan emulsion, EPN emulsion, and Diazinon emulsion. Those containers which are out of the scope of this invention suffered more or less from cracking. Non-polar hydrocarbon solvents did not cause serious cracking, but polar solvents and agricultural chemicals did. Toluene and xylene, which are similar in chemical structure to each other and have almost the same polarity and solubility parameter, behaved differently from each other. That is, toluene brought about serious cracking, but xylene did not. In some containers, gasoline (which often contains additives) caused severe cracking.

The effect of this invention was significant in the cracking test. No cracking occurred in the containers which satisfy all of the above-mentioned requirements of this invention, regardless of the inorganic filler and the kind of organic solvent used. The effects of this invention are not obtained when any one of the requirements is not satisfied.

EVOH resin having a specific gravity (d) lower than $(1.274 - 4.4 \times 10^{-3}X)$ does not crack readily, but it becomes so poor in oxygen barrier properties as the humidity rises that it is of less practical value for packaging use. In addition, it is poor in resistance to organic solvents, particularly polar solvents. On the other hand, EVOH resin having a specific gravity (d) higher than $(1.332 - 4.4 \times 10^{-3}X)$ cannot be effectively used in this invention. Presumably, a high specific gravity leads to a high degree of crystallinity, which in turn causes internal stress.

Cracking is related to the molding method by which the containers are produced. Usually cracking easily occurs in containers produced by coextrusion molding, blow molding, or deep drawing of composite sheet. In these molding methods, EVOH resin and thermoplastic resin are handled in the molten state. The difference between the two resins in melt viscosity at the time of molding and in shrinkage at the time of cooling tends to cause a great strain and hence a great residual stress. This strain is aggravated when $|Y_1 - Y_2|$ is greater than 1 and $Y_2$ is greater than 1 (wherein $Y_1$ is an MI value of thermoplastic resin and $Y_2$ is an MI value of EVOH resin). The strain is also closely related with the specific gravity (d), or the degree of crystallinity, of EVOH resin.

As mentioned above, the inner layer of the container of this invention is made of EVOH resin having a high degree of polymerization, that is, having a MI value lower than 1, particularly lower than 0.9. However, the production of such EVOH resin requires special polymerization conditions and is limited in productivity. If the EVOH resin is to be produced by the conventional solution polymerization method, it is necessary to greatly reduce the quantity of solvent and to perform polymerization at a comparatively low temperature (particularly in the case where the content of ethylene in the resin is increased.) Polymerization under such conditions forms a large quantity of gel that deposits on the heat transfer surface to reduce the efficiency of heat removal. This makes it impossible to carry out polymerization continuously over a long period of time. Moreover, the gel enters the EVOH resin and lowers its quality. For the reasons mentioned above, up to now it has been impossible to industrially produce EVOH resin of MI values lower than 1, particularly lower than 0.9, having the satisfactory quality.

One of the present inventors established a process for the continuous polymerization of ethylene-vinyl acetate which can be suitably changed into EVOH resin having the satisfactory quality, and also established a process for the production of EVOH resin. (Refer to Japanese Patent Laid-open Nos. 19314/1983 and 47010/1983, and Japanese Patent Application Nos. 83652/1982, 89242/1982, and 104180/1982.)

According to this process, copolymerization is carried out under specific polymerization conditions by using a polymerization initiator having an extremely short half-life. It can be suitably applied to the production of EVOH resin which is used in this invention. However, this invention is not restricted to this process only. The scope of this invention embraces the production of modified EVOH resin in which the molecules of EVOH resin are crosslinked by a crosslinking agent so that the MI value satisfies the requirements of this invention. In such a case, examples of the preferred crosslinking agents include boric acid, borax and derivatives thereof; polyfunctional epoxy compounds, polybasic carboxylic acids, and derivatives thereof; and polyisocyanate and dialdehyde. Modification with crosslinking agents is particularly effective in reducing the MI value of a copolymer containing a comparatively large quantity of ethylene. The lowering of the MI value by crosslinking may be combined with the proper polymerization conditions to provide a copolymer of low MI values.

Where the two-layered container of this invention is used for agricultural chemicals which should be kept away from light, the outer layer of thermoplastic resin is incorporated with an inorganic filler such as fine calcium carbonate powder having a particle diameter of 0.1 to 50 $\mu$m. The quantity of the filler is usually 70 to 300 parts by weight per 100 parts by weight of the thermoplastic resin. The incorporation of such an inorganic filler usually raises the melt viscosity of the thermoplastic resin. The EVOH resin combined with such a filled thermoplastic resin tends to crack more readily than that combined with an unfilled thermoplastic resin. The effect of this invention is significant in such a case.

The EVOH resin used in this invention should contain ethylene in an amount of 25 to 60 mole %. It may be a blend of EVOH resins which contain a different amount of ethylene but are miscible with one another.

In the production of the multi-layered containers of this invention, it is preferable to interpose an adhesive layer between the EVOH layer and the thermoplastic resin layer. However, the adhesive layer is not required in the case where the thermoplastic resin is modified polyethylene or polypropylene containing carboxyl groups which exhibits improved adhesion. The adhesive layer may be suitably produced from carboxyl group-containing modified polyethylene or polypropylene, ethylene-vinyl acetate copolymer, urethane elastomer, or ethylene-vinyl acetate copolymer grafted with an unsaturated carboxylic acid or anhydride thereof. The adhesive layer is usually 2 to 3 µm thick. In addition, the adhesive layer should preferably have a melt viscosity similar to that of the thermoplastic resin and EVOH resin.

The multi-layered packaging container of this invention can be produced mainly by coextrusion blow molding. It can also be produced from multi-layered film formed by multi-layer injection blow, T-die coextrusion, or coextrusion inflation. Coextrusion may require a specially built molding machine in the case where the melt viscosity is extremely high.

The multi-layered packaging container of this invention should have an inner layer of EVOH resin which is thinner than 500 µm, preferably from 10 to 400 µm. The outer layer of thermoplastic resin may be made up of two or more layers. The outer layer should be 0.3 to 1.5 mm thick, depending on the mechanical strength required and the quantity of the contents to be filled.

The invention is now described in more detail with reference to the following non-limitative examples.

EXAMPLES 1 TO 4 AND COMPARATIVE EXAMPLES 1 to 4

Multi-layered packaging containers were prepared by coextrusion blow molding as follows: The outer layer was made of high-density polyethylene or polypropylene. The inner layer was made of EVOH resin containing 30 mole % of ethylene and having a degree of saponification of 99.2 mole %. The intermediate layer (adhesive layer) was made of modified polyolefin ("MODIC", a product of Mitsubishi Petrochemical). The raw materials were fed to the respective extruders. The exruders for the outer and intermediate layers wre set at 160° to 200° C., and the extruder for the inner layer was set at 180° to 220° C. The three extruders were joined together at a three-layer die head heated at 220° C. The three resins were firmly bonded together when they were passed through the die and extruded in the form of a tubular parison having three concentric layers. The parison underwent blow molding. The container thus formed had a volume of about 500 ml, and the outer layer was about 0.81 mm thick, the intermediate layer was 0.01 mm thick, and the inner layer was 0.05 to 0.35 mm thick.

Crack resistance tests were performed as follows on the containers thus produced. Each container was filled with 450 ml of agricultural chemicals of different kinds, and was subjected to three cycles of heating, each cycle consisting of heating at 40° C. for 30 days and standing at normal temperature for 1 day and at −20° C. for 3 days. After the tests, the containers were checked for cracking. The results are shown in Table 1. The crack resistance is expressed in terms of the number of intact containers out of 20 containers tested.

TABLE 1

| Examples | Outer layer Resin | MI | Inner layer (EVOH) MI | d | Thickness of inner layer (µm) | Content | Crack resistance |
|---|---|---|---|---|---|---|---|
| Example 1 | Polyethylene | 0.3 | 0.56 | 1.187 | 105 | DDVP emulsion | 20 |
| Example 2 | Polyethylene | 0.3 | 0.89 | 1.185 | 85 | DDVP emulsion | 18 |
| Example 3 | Polypropylene | 0.5 | 0.67 | 1.186 | 320 | Estox emulsion | 19 |
| Example 4 | Polyethylene | 1.5 | 0.52 | 1.185 | 80 | Hinozan emulsion | 20 |
| Comparative Example 1 | Polyethylene | 0.3 | 1.5 | 1.186 | 350 | DDVP emulsion | 2 |
| Comparative Example 2 | Polypropylene | 0.5 | 1.2 | 1.204 | 268 | Estox emulsion | 4 |
| Comparative Example 3 | Polyethylene | 2.5 | 0.92 | 1.187 | 158 | Hinozan emulsion | 3 |
| Comparative Example 4 | Polyethylene | 0.5 | 0.95 | 1.204 | 200 | DDVP emulsion | 2 |

EXAMPLES 5 TO 7 AND COMPARATIVE EXAMPLES 5 to 7

The same tests as in Examples 1 to 5 and Comparative Examples 1 to 5 were carried out except that the outer layer was made of polyethylene or polypropylene filled with 100 parts by weight of calcium carbonate having an average particle diameter of 1.8 µm per 100 parts by weight of the polyethylene or polypropylene. The results are shown in Table 2.

EXAMPLES 8 TO 10 AND COMPARATIVE EXAMPLES 8 to 10

The same tests as in Examples 1 to 7 and Comparative Examples 1 to 7 were carried out except that the inner layer was made of EVOH resin containing 41 mole % of ethylene and having a degree of saponification of 99.4 mole %. The results are shown in Table 3.

EXAMPLE 11

The same test as in Example 8 was carried out except that the inner layer was made of EVOH resin which had been mixed with 1 wt % of boric acid by an extruder so that the MI value was reduced to 0.75. The thickness of the inner layer was 86 µm, and the specific gravity (d) of the resin for the inner layer was approximately equal to that of the resin used in Comparative Example 8. The result of crack resistance was 19 when the containers were filled with Hinozan emulsion.

TABLE 2

| Examples | Outer layer Resin | MI | Inner layer (EVOH) MI | d | Thickness of inner layer (µm) | Content | Crack resistance |
|---|---|---|---|---|---|---|---|
| Example 5 | Polyethylene | 0.9 | 0.58 | 1.187 | 109 | DDVP emulsion | 20 |
| Example 6 | Polyethylene | 0.3 | 0.95 | 1.186 | 256 | Hinozan emulsion | 19 |
| Example 7 | Polypropylene | 0.5 | 0.65 | 1.187 | 155 | Estox emulsion | 20 |
| Comparative | Polyethylene | 0.3 | 1.65 | 1.187 | 108 | DDVP emulsion | 2 |

TABLE 2-continued

| Examples | Outer layer Resin | MI | Inner layer (EVOH) MI | d | Thickness of inner layer (μm) | Content | Crack resistance |
|---|---|---|---|---|---|---|---|
| Example 5 Comparative Example 6 | Polypropylene | 0.5 | 0.96 | 1.204 | 135 | Hinozan emulsion | 3 |
| Comparative Example 7 | Polyethylene | 1.6 | 1.53 | 1.186 | 115 | Estox emulsion | 2 |

TABLE 3

| Examples | Outer layer Resin | MI | Inner layer (EVOH) MI | d | Thickness of inner layer (μm) | Content | Crack resistance |
|---|---|---|---|---|---|---|---|
| Example 8 | Polyethylene | 0.3 | 0.75 | 1.146 | 215 | DDVP emulsion | 18 |
| Example 9 | Polyethylene (filled) | 0.3 | 0.83 | 1.149 | 105 | Hinozan emulsion | 19 |
| Example 10 | Polypropylene | 0.5 | 0.92 | 1.147 | 95 | Estox emulsion | 18 |
| Comparative Example 8 | Polyethylene | 0.3 | 5.61 | 1.148 | 85 | Hinozan emulsion | 1 |
| Comparative Example 9 | Polypropylene | 0.5 | 0.92 | 1.157 | 310 | DDVP emulsion | 2 |
| Comparative Example 10 | Polyethylene (filled) | 1.6 | 1.51 | 1.147 | 75 | DDVP emulsion | 1 |

What is claimed is:

1. A multi-layered packaging container superior in crack resistence, said container comprising an outer layer of a polyolefin resin and an inner layer of saponified ethylene-vinyl acetate copolymer characterized in that the ethylene content is 25 to 60 mole %, the degree of saponification of the vinyl acetate component is higher than 96 mole %, the melt viscosity index is lower than 1, g/10 minutes the specific gravity (d) is in the range specified by formula (1) below, and $Y_1$ and $Y_2$ are in the range specified by the formula (2) below:

$$1.274 - 4.4 \times 10^{-3} X < d < 1.332 - 4.4 \times 10^{-3} X \quad (1)$$

$$|Y_1 - Y_2| \leq 1 \quad (2)$$

where d is the specific gravity of EVOH resin at 25° C., X is the ethylene content (mole %) of EVOH resin, and $Y_1$ and $Y_2$ are the melt viscosity indices of the thermoplastic resin and the saponified product of ethylene-vinyl acetate copolymer, respectively.

2. A packaging container as claimed in claim 1 wherein the polyolefin resin is polyethylene resin.

3. A packaging container as claimed in claim 1 wherein the container contains organic liquids.

4. A packaging container as claimed in claim 3 wherein the organic liquids are hydrocarbon liquids.

5. A packaging container as claimed in claim 1 wherein the container contains agricultural chemicals.

* * * * *

UNITED STATES PATENT AND TRADEMARK OFFICE
CERTIFICATE OF CORRECTION

PATENT NO. : 4,619,849

DATED : October 28, 1986

INVENTOR(S) : Haruyoshi Anzawa et al

It is certified that error appears in the above-identified patent and that said Letters Patent is hereby corrected as shown below:

In Claim 1, line 8 thereof, after "1" delete ",".

In Claim 1, line 8 thereof, after "minutes" insert -- , --.

In Claim 1, lines 15-16 thereof, delete "thermoplastic" and insert in lieu thereof -- polyolefin -- .

Signed and Sealed this

Twenty-fourth Day of February, 1987

*Attest:*

DONALD J. QUIGG

*Attesting Officer*      *Commissioner of Patents and Trademarks*